July 19, 1960          G. BECCIO          2,945,578
VARIABLE SPACING MECHANISM FOR TYPEWRITERS
Filed July 18, 1956          3 Sheets-Sheet 1
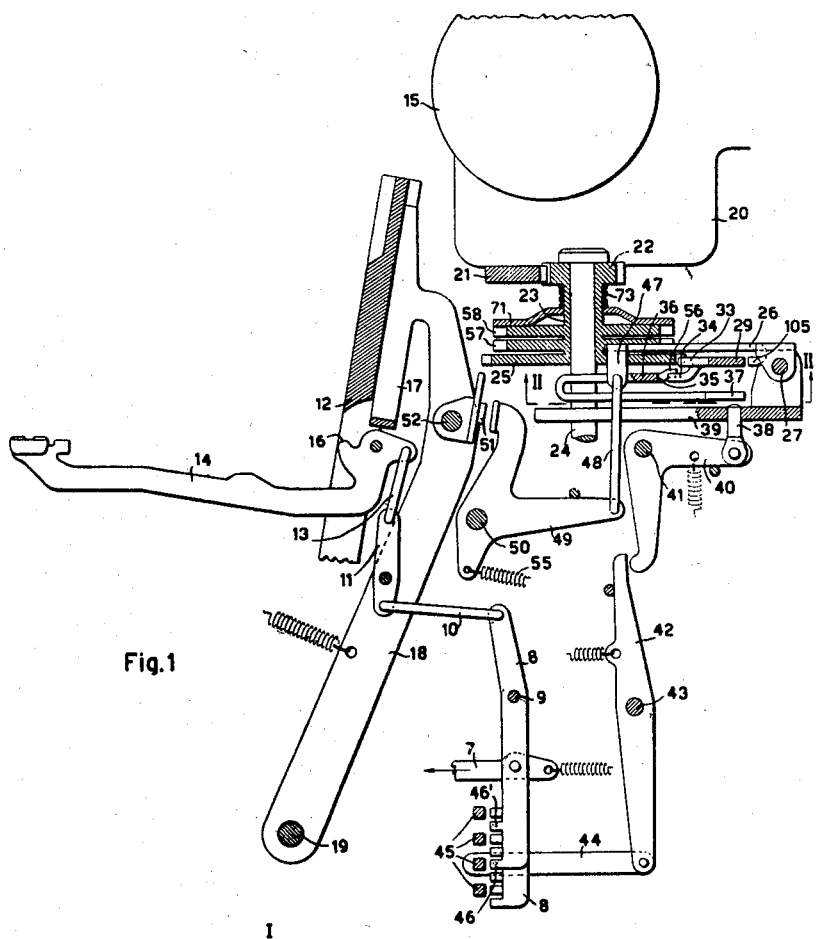

July 19, 1960 G. BECCIO 2,945,578
VARIABLE SPACING MECHANISM FOR TYPEWRITERS
Filed July 18, 1956 3 Sheets-Sheet 2
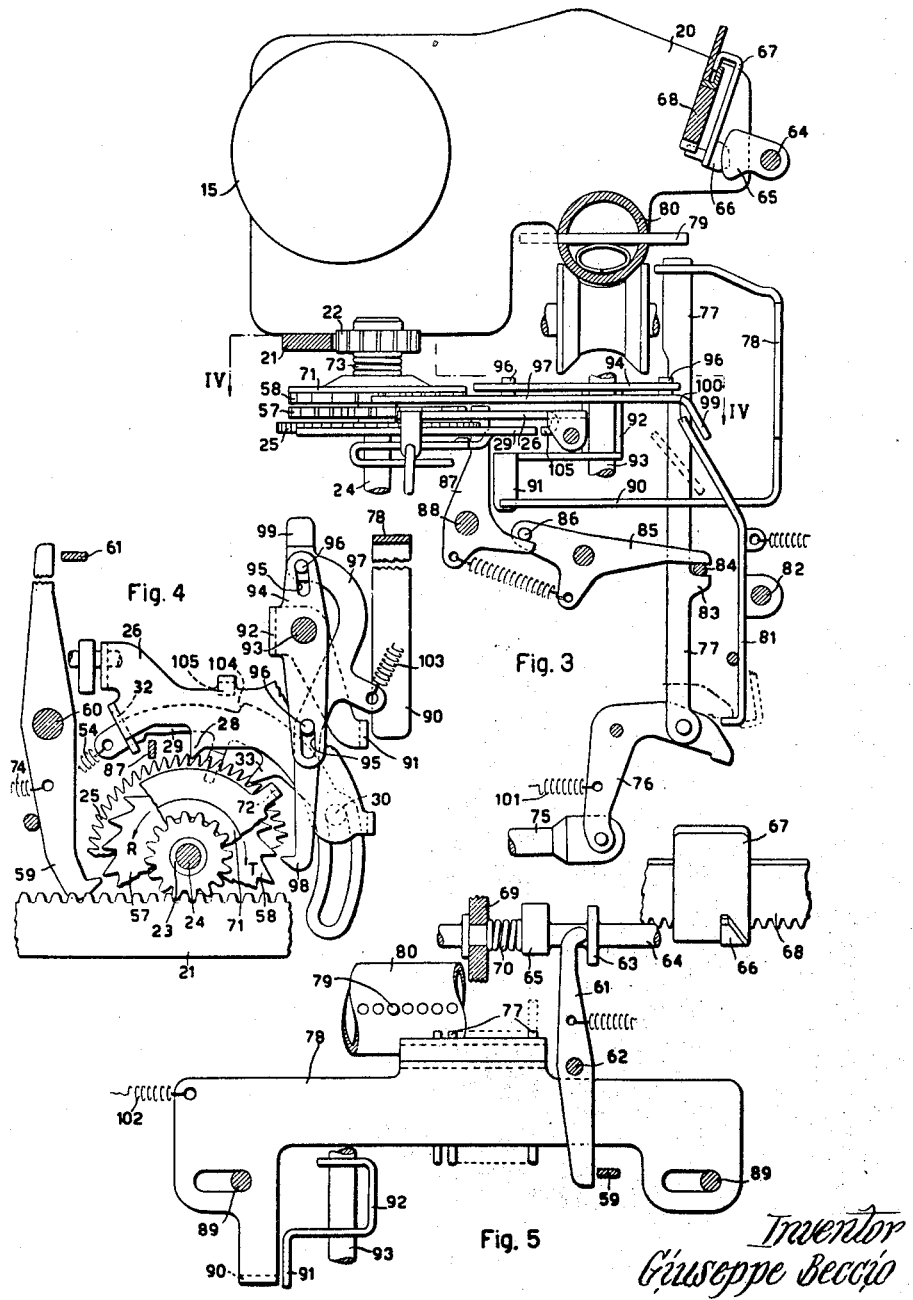

July 19, 1960  G. BECCIO  2,945,578
VARIABLE SPACING MECHANISM FOR TYPEWRITERS
Filed July 18, 1956  3 Sheets-Sheet 3

Inventor
Giuseppe Beccio

United States Patent Office 2,945,578
Patented July 19, 1960

2,945,578

VARIABLE SPACING MECHANISM FOR TYPEWRITERS

Giuseppe Beccio, Ivrea, Italy, assignor to Ing. C. Olivetti & C., S.p.A., Ivrea, Italy, a corporation of Italy Filed July 18, 1956, Ser. No. 598,569

Claims priority, application Italy Oct. 21, 1957

13 Claims. (Cl. 197—84)

The present invention relates to typewriting machines and is more specifically concerned with a variable spacing mechanism for said machines.

Variable spacing mechanisms are known, in which an escapement wheel having teeth spaced apart at unit intervals of spacing is alternately engageable by a fixed dog and a movable dog, said movable dog normally engaging the escapement wheel and being adapted to be disengaged therefrom to retrograde to a variable number of units. In these mechanisms the movable dog is disengaged from the escapement wheel under the control of the usual universal bar which is operable by the type levers.

In some of the conventional mechanisms hitherto known the movable dog reengaged the escapement wheel as soon as the universal bar returned to normal, whereby it happened that for the widest amounts of spacing the movable dog reengaged the escapement wheel before terminating its retrograde movement, thus mutilating the effective width of spacing.

The purpose of the present invention is to eliminate this and other drawbacks and to provide a variable spacing mechanism which is of a very reliable operation.

The mechanism according to the invention comprises an escapement member having teeth spaced apart at unit intervals of spacing, a movable dog normally engaging the escapement member and being adapted to be disengaged therefrom to retrograde to a variable extent according to a variable number of said units, a type action operable universal bar for disengaging the movable dog from the escapement member, means for reengaging the movable dog with said escapement member, and means for retarding the action of said reengaging means to enable said movable dog to complete its retrograde movement before reengaging said escapement member.

In a particular form of an embodiment of the invention said retarding means comprise an element movable through various extents and adapted to precede said movable dog during said retrograde movement and to arrest same upon completion of said movement, said element being adapted to disable said reengaging means during the full extent of its movement.

According to a modified form of an embodiment of the invention said retarding means comprise an element movable under the action of said universal bar, and means controlled by said element immediately upon the beginning of its movement for disengaging the movable dog and further controlled immediately before completion of said movement for reengaging same, the intermediate portion of said movement being without effect on the movable dog.

Further objects, features and advantages of the invention will become apparent from the following detailed description of a preferred embodiment thereof, taken in conjunction with the accompanying drawings in which:

Fig. 1 is a partial vertical section of a typewriting machine embodying a first form of the invention;

Fig. 2 is a partial sectional view taken on line II—II of Fig. 1;

Fig. 3 is a second partial vertical section of said typewriting machine;

Fig. 4 is a partial sectional view taken on line IV—IV of Fig. 3;

Fig. 5 is a partial vertical rear view of said machine;

Figure 6:
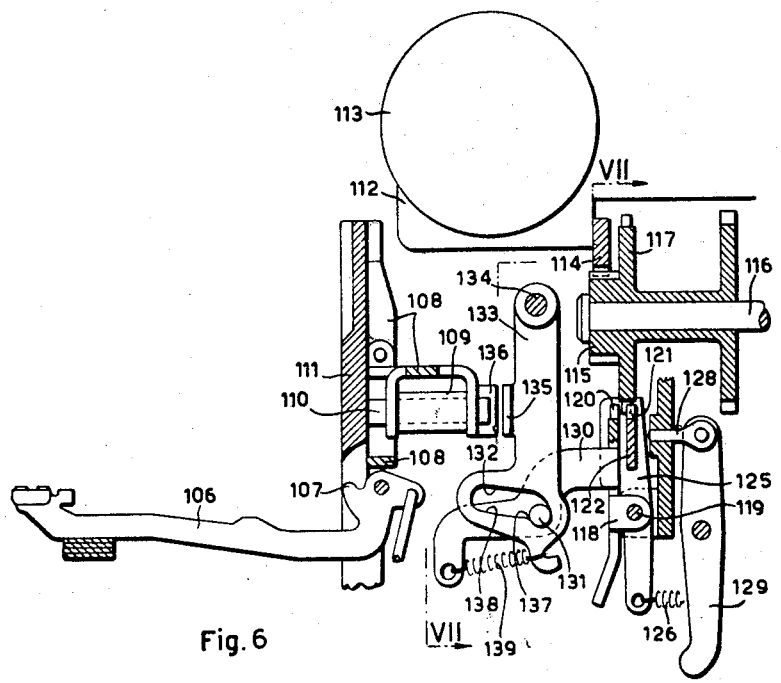
Fig. 6 is a partial vertical section of a typewriting machine embodying a modified form of the invention.

With reference to Fig. 1, the mode of operation of the type action of a conventional typewriter such as described in the Italian Patent No. 516,704 will first be summarized. Upon depression of a character key not shown in the drawings, a link 7 is moved leftwards. This rocks a lever 8 pivoted at 9, moving a wire link 10 rightwards. Through a link 11 pivotally mounted on the usual type lever segment 12 a second wire link 13 is moved downwards, thus throwing the associated type lever 14 against the usual platen roller 15. During the last few degrees of rotation of the type lever 14 a cam portion 16 of the latter strikes against the usual universal bar 17, carried by an arm 18 pivotally mounted at 19 on the type lever segment 12.

The platen roller 15 is supported by the usual carriage 20 which is urged to advance in a character spacing direction by a spring not shown in the drawings. The carriage 20 is provided with a rack 21 (Figs. 1 and 2) meshing with a pinion 22 integral with a hub 23 rotatably mounted on a shaft 24 secured to the machine frame. The hub 23 supports at its lower end an escapement wheel 25 having its teeth spaced apart at unit intervals of spacing. In a manner to be hereinafter described, upon depression of a character key the escapement wheel 25 will be spaced a number of units corresponding to the space requirement or width of the selected character.

The particular spacing mechanism provided according to a first form of the present invention will now be described in detail.

The escapement wheel 25 cooperates with an escapement rocker 26 pivotally mounted on two stationary pivot pins 27 (Figs. 1 and 2). The rocker 26 is provided with a fixed dog 28 and with a movable dog 33 adapted to alternately engage the escapement wheel 25. The movable dog 33 projects from a slide 29 movable in a slot of a bent-over lug 32 of the rocker 26 and formed with a curved slot 31 concentric with the shaft 24 and cooperating with a pin 30 secured to the rocker 26. Normally the rocker 26 is in a position in which the escapement wheel 25 is engaged by the movable dog 33. The slide 29 is formed with a projection 34 normally engaging a slot 35 of a sector 36 rotatably mounted on the shaft 24 and provided with a bent-over arm 37 adapted to be arrested by a selected one of a set of selectively settable and differentially positioned stop pins 38.

Each one of the stop pins 38 is adapted to slide in a perforation of a stationary plate 39 and is pivotally supported by a lever 40 journalled at 41. The lever 40 cooperates with a lever 42 pivoted at 43 which in turn is connected to an arm 44 of a bail 45. There are provided four bails 45, as many as are the stop pins 38 (Fig. 2), and each bail 45 is engageable by a particular projection 46 of the lever 8. To compensate for the difference of the widths of the upper case type and the lower case type of each type lever, the set of bails 45 may be shifted downwards by known means, whereby the projection 46 becomes ineffective and a differently located projection 46' of the lever 8 is enabled to engage a different one of the bails 45.

As shown in Fig. 1, the rocker 26 is formed with an extension 47 bent downwards and connected through a wire link 48 to a lever 49 pivotally mounted at 50 and engageable by a hammer like member 51 rigidly supported by a shaft 52 secured to the arm 18 of the universal bar 17.

The mechanism operates as follows:

Upon depression of a character key the associated lever 8 is rocked clockwise, whereby its projection 46 moves the corresponding bail 45 leftwards. By the intermediary of the levers 42 and 40 the corresponding stop pin 38 is thus moved upwards. As the cam 16 of the type lever 14 strikes against the universal bar 17, the lever 49 is rocked clockwise (Fig. 1), and the rocker 26 is rocked counterclockwise against the urge of a spring 55. The movable dog 33 will thus be disengaged from the wheel 25 which in turn will be engaged by the fixed dog 28. As a consequence, the wheel 25 will be permitted to advance through a first, very small extent corresponding to the clearance normally left between the fixed dog 28 and the juxtaposed tooth of the wheel 25 (see Fig. 2).

Moreover, upon rocking the rocker 26 the projection 34 will be disengaged from the slot 35. While the movable dog 33 upon being disengaged from the wheel 25 has been permitted to be retrograded with the slide 29 under the urge of its spring 54, even the sector 36 will be permitted to be rotated clockwise by its spring 53, independently of the movement of the slide 29. However, the two springs 54 and 53 are designed in such a manner that the slide 29 is moved at a lower angular speed than the sector 36, whereby the latter starts more quickly than the slide 29 and as long as it is rotating it prevents the projection 34 from returning into the slot 35. The rocker is thus locked in its counterclockwise rocked position, irrespective of the return of the universal bar 17 to its normal position shown in Fig. 1. As the arm 37 contacts the stop pin 38 set in the manner previously described, the sector 36 is arrested. A few instants later the projection 34 arrives over the slot 35 and may now enter the slot, whereby the rocker 26 is enabled to be rocked clockwise (Fig. 1) by its spring 55. The movable dog 33 reengages the wheel 25 and the fixed dog 28 disengages same. Under the urge of the spacing spring mentioned hereinabove the wheel 25 advances a further extent until the slide 29 will be arrested by the pin 30 (position shown in Fig. 2), thus completing the character spacing of the carriage 20 by the required amount. To prevent the projection 34 from retrograding with the slide 29 beyond the slot 35, the sector 36 is provided with a bent-over lug 56 (Figs. 1 and 2) adapated to arrest the projection 34 and to assist the latter in entering the slot 35.

It will thus be apparent that the width of spacing of the carriage 20 depends upon the particular stop pin 38 previously selected. Furthermore, considering the spring 55 as a means for reengaging the movable dog 33 with the escapement wheel 25, it will be clear that the sector 36 retards the action of said spring to enable the movable dog 33 to complete its retrograde movement before reengaging the wheel 25, the extent of said movement being variable according to the position of the selected stop pin 38.

It has been stated above that the teeth on the escapement wheel 25 are spaced apart one unit of spacing. During tabulating operations, and in carriage-return operations it has been found to be very difficult to always catch the right tooth when reengaging the movable dog due to the very narrow tooth spacing.

To obviate these difficulties the invention provides two auxiliary escapement wheels 57 and 58 (Figs. 3 and 4) which are integral with the escapement wheel 25. The escapement wheel 57 cooperates with a pawl 59 (Fig. 4) pivoted at 60 and normally disengaged from the wheel 57. The pawl 59 is engageable by a vertical lever 61 (Figs. 4 and 5) pivoted at 62 and contacting a flange 63 (Fig. 5) of a transverse shaft 64 slidably mounted on the machine frame 69. The shaft 64 is provided with a shoulder 65 (Figs. 3 and 5) adapted to arrest an abutment 66 of a conventional left hand margin regulator 67 upon the return movement of the carriage 20. The margin regulator 67 is slidably mounted on a margin regulator detent rack 68 the teeth of which are spaced apart three units of spacing. A compression spring 70 is inserted between the shoulder 65 and the machine frame 69.

Rotatably mounted on the hub 23 is the usual silencing disc 71 (Figs. 3 and 4) provided with a finger 72 (Fig. 4). A compression spring 73 mounted on the hub 23 is adapted to press the disc 71 against the wheel 58, whereby upon rotation of the latter the disc 71 is frictionally rotated through a limited extent in a manner known in the art.

During the return of the carriage the rack 21 is moved rightwards (as seen in Fig. 4) and the wheel 57 rotates in the direction of the arrow R. Upon beginning said return movement the disc 71 is rotated in the same direction and the finger 72 disengages the movable dog 33 from the escapement wheel 25. As upon completion of the return movement of the carriage the abutment 66 of the left hand margin regulator 67 contacts the shoulder 65, the shaft 64 is thrust leftwards (Fig. 5) against the action of the spring 70. The flange 63 rocks the lever 61 counterclockwise (Fig. 5), whereby the pawl 59 is rocked counterclockwise (Fig. 4) into engagement with the wheel 57.

It will thus be apparent that the return movement of the carriage is arrested by the intermediary of the wheel 57, thus obviating the uncertainty of the position of the escapement wheel 25 with respect to the movable dog 33 caused by the mechanical clearances existing in the transmission from the margin regulator 67 to the escapement wheel 25. However, as soon as the operator releases the carriage the latter recoils through a little extent (advancing leftwards as seen in Fig. 4) under the urge of its spring, whereby the finger 72 releases the movable dog 33 which at last is permitted to reengage the wheel 25. At the same time the flange 63 releases the lever 61 and the pawl is disengaged from the wheel 57 under the action of a spring 74. The final result is that the carriage is kept arrested by the movable dog 33 as usually.

The auxiliary escapement wheel 58 referred to above is provided for arresting the carriage in tabulating operations. The tabulator schematically shown in Figs. 3 and 5 is of a well known type and will be summarized very briefly.

Upon depression of a tabulator key, not shown in the drawings, a bar 75 (Fig. 3) is pushed rightwards, thus rocking a lever 76 counterclockwise and moving a stop finger 77 upwards. The stop finger 77 is slidable in a slot of a plate 78 and is adapted to be set into the path of a selected one of a set of stop pins 79 slidably mounted in a tubular tabulator bar 80 supported by the carriage 20. Upon being rocked counterclockwise the lever 76 is locked by a detent plate 81 pivotally supported at 82.

The stop pins 79 of the tabulator bar 80 are spaced apart three units of spacing. In the case of a decimal tabulator, in which there is provided a set of selectable stop fingers 77 (Fig. 5), the stop fingers 77 are spaced apart three units of spacing as well.

Each one of the stop fingers 77 is provided with a projection 83 cooperating with a universal bar 84 which in turn cooperates with a lever 85 carrying a pin 86. The latter engages a lever 87 pivotally mounted at 88 and adapted to engage the slide 29 (Fig. 4).

The plate 78 is slidably mounted on two pins 89 (Fig. 5) and is formed with a bent-over lug 90 cooperating with a lug 91 of a bail 92 rotatably mounted on a shaft 93. An arm 94 of the bail 92 has two slots 95 (Fig. 4) each one housing a pin 96 secured to a slide 97. The latter is formed at one end with a pawl 98 adapted to engage the wheel 58 and at the opposed end with a bent-over lug 99 cooperating with a lug 100 (Fig. 3) of the detent plate 81.

Upon depression of a tabulator key the selected stop finger 77 is moved upwards and the lever 85 is rocked counterclockwise, whereby the lever 87 shifts the slide 29 upwards as seen in Fig. 4 and disengages the movable dog 33 from the escapement wheel 25, thus releasing the carriage 20. Upon engagement of the stop finger 77 by a stop pin 79 the plate 78 is moved rightwards (Fig. 5). The lug 90 rocks the bail 92 clockwise about the shaft 93 (Fig. 4), whereby the slide 97 is rocked along with the bail 92 and the pawl 98 is moved into engagement with the wheel 58 which is now advancing in the direction according to the arrow T. Upon said engagement the wheel 58 pulls the slide 97 downwards until the pins 96 abut against the lower end of the corresponding slots 95, thus arresting the carriage 20. During this movement of the slide 97 (leftwards as seen in Fig. 3) the lug 99 engages the lug 100 and rocks the detent plate 81 counterclockwise, thus releasing the lever 76 previously latched in the position indicated by broken lines. Under the action of a spring 101 the stop finger 77 disengages from the stop pin 79 and is restored to normal, whereby the plate 78 is permitted to be restored to normal by a spring 102. The lever 87 returns to normal as well, releasing the slide 29, whereby the movable dog 33 is permitted to reengage the wheel 25.

Upon restoration of the plate 78 the lug 90 releases the bail 92, whereby the pawl 98 disengages from the wheel 58 under the action of a spring 103 (Fig. 4). As a final result the carriage will thus be kept arrested by the movable dog 33 as usually.

To avoid an excessive additional travel of the carriage at the end of the tabulation or an excessive recoil at the end of the return travel due to the disengagement of the movable dog 33 without any stop pins 38 being set up, there is provided a special stop to arrest the retrograde movement of the movable dog upon disengagement from the wheel 25. As may be seen in Figs. 2 and 4, the rocker 26 is formed with a stop lug 105 adapted to cooperate with an abutment 104 of the slide 29. Upon disengagement of the movable dog 33 by the action either of the finger 72 or the lever 87 (Fig. 4), the slide 29 is shifted so as the abutment 104 finds the stop lug 105 in its path of travel and the retrograde movement of the slide 29 is arrested.

A modified form of an embodiment of the invention according to Figs. 6 and 7 will now be described.

Figure 7:
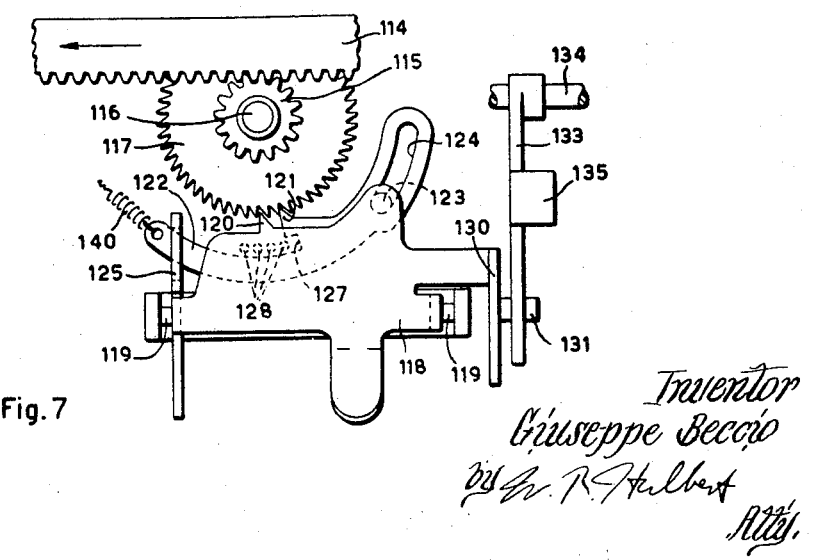
Fig. 7 is a partial sectional view taken on line VII—VII of Fig. 6.

With reference to Fig. 6, the usual type lever 106 is formed with a cam 107 adapted to strike against a universal bar 108 slidably mounted by means of a sleeve 109 on a shaft 110 secured to the type lever segment 111, as is fully described in applicant's Italian patent specification 456,567.

The reference numeral 112 generally indicates the carriage supporting a platen roller 113 and urged by the usual spacing spring, not shown in the drawings. The carriage 112 further supports a rack 114 meshing with a pinion 115 (Figs. 6 and 7) rotatably mounted on a stationary shaft 116 and integral with an escapement wheel 117 having its teeth spaced apart at unit intervals of spacing.

The escapement wheel 117 cooperates with an escapement rocker 118 pivotally mounted on two pivot pins 119. The rocker 118 is provided with a fixed dog 120 and with a movable dog 121 adapted to alternately engage the escapement wheel 117. The movable dog 121 projects from a slide 122 movable in a slot of a bent-over lug 125 (Fig. 7) of the rocker 118 and formed with a curved slot 124 concentric with the shaft 116 and cooperating with a pin 123 secured to the rocker 118. Normally the rocker 118 is held by a spring 126 in a position in which the escapement wheel 117 is engaged by the movable dog 121 (Fig. 6).

The slide 122 is formed with an edge 127 (Fig. 7) adapted to cooperate with a set of selectable stop pins 128. Each stop pin 128 is supported by a lever 129 (Fig. 6) adapted to shift the stop pin 128 leftwards. The selective setting of the stop pins 128 is similar to that of the stop pins 38 (Fig. 1) and will not be described.

The rocker 118 is formed with an arm 130 supporting a pin 131 cooperating with a cam slot 132 of a lever 133 pivotally mounted on a pivot 134. The lever 133 is formed with a bent-over extension 135 adapted to be acted upon by a lug 136 of the universal bar 108. The lower edge of the cam slot 132 comprises a first short sloping portion 137 and an adjacent longer portion 138 concentric with the pivot 134. A spring 139 is tensioned between the lever 133 and the arm 130 and assists the spring 126 in holding the rocker 118 in the normal position of Fig. 6.

The mechanism operates as follows:

Upon depression of a character key a stop pin 128 is set in the usual manner into the path of the edge 127 of the slide 122. Furthermore the cam 107 throws the universal bar 108 rightwards against the urge of a restoring spring not shown in the drawings. The lug 136 of the universal bar 108 rocks the lever 133 counterclockwise, whereby during the first few degrees of movement the portion 137 of the cam slot 132 raises the pin 131. The rocker 118 is thus immediately rocked clockwise about the pivot pins 119. During the further movement of the lever 133 the concentric portion 138 of the cam slot 132 does not affect the pin 131, only further tensioning the spring 139.

Upon being rocked clockwise the rocker 118 disengages the movable dog 121 from the wheel 117 and engages the fixed dog 120 therewith. Consequently, the wheel 117 will be permitted to advance through the first small extent, while the slide 122 may retrograde under the action of its spring 140 (Fig. 2) until arrested by the stop pin 128 previously set up.

As the universal bar 108 returns to normal, the lever 133 will be permitted to be rocked clockwise by the spring 139. However, the spring 139 is designed in such a manner that the lever 133 is returned to normal slower than the universal bar 108. During the return stroke of the lever 133 the pin 131 first rides along the portion 138 of the cam slot 132, thus preventing the rocker 118 to be returned to normal. As the pin 131 arrives over the sloping portion 137 of the cam slot it may at last fall down and the rocker 118 is permitted to be rocked counterclockwise under the combined action of the springs 126 and 139. The movable dog 121 reengages the wheel 117 and the fixed dog disengages same. Under the urge of the spacing spring mentioned hereinabove the wheel 117 advances a further extent until the slide 122 will be arrested by the pin 123 (position shown in Fig. 7), thus completing the character spacing of the carriage 112.

From the foregoing description it will be apparent that the lever 133 retards the return stroke of the rocker 118 until the last few degrees of the return stroke of the lever 133 to enable the movable dog 121 to complete its retrograde movement before reengaging the escapement wheel 117. It will furthermore be clear that by simple interposition of the lever 133 between the universal bar 108 and the rocker 118, the law of motion of the rocker will result so modified to assume a substantially rectangular shape, having a relatively sharp rise at the beginning, then a substantially flat intermediate stride, and finally a relatively sharp descent, the entire flat stride being at disposition for the retrograde movement of the movable dog.

It is not necessary to use the entire flat portion 118 of the cam slot 132 to enable the movable dog 121 to make its retrograde movement. To this end it practically suffices that the pin 131 just passes the sloping portion 137. This happens when the character key has been touched very lightly, so that the type lever hardly succeeds in contacting the platen 113 and imparts a very weak stroke to the universal bar 108. The remainder of the portion 138 serves to avoid that in the case of stronger impacts upon the universal bar 108, the lever 133 which has no stops in its path of travel, rebounds against the pin 131. This is important in the case of hand operated typewriters as the touch may vary within a very wide range.

While the principles of the invention have been described above in connection with specific embodiments, it is to be clearly understood that this description is made only by way of example and not as a limitation on the scope of the invention. In this connection it may be remarked that the lever 133 may be replaced by other mechanisms, such as toggle mechanisms or the like, to retard the re-engagement of the movable dog by modifying its law of motion in the manner mentioned hereinabove. It may furthermore be remarked that the two auxiliary escapement like wheels 57 and 58 (Fig. 4) may be replaced by a single symmetrically toothed wheel 141 (Fig. 6) whose teeth be adapted to cooperate both with the pawls 59 and 98.

It is to be understood that the size of the slot 125 (Fig. 7) is extended beyond the actual width of the slide 122 to enable the latter to be turned about the pin 123 for the purpose of disengaging the movable dog 121 from the wheel 117 in tabulation and carriage return operations. The same applies to the slot 32 (Figs. 2 and 4):

What I claim is:

1. In a variable spacing mechanism, an escapement member having teeth spaced apart at unit intervals of spacing, a movable dog normally engaging the escapement member and being adapted to be disengaged therefrom to retrograde to a variable extent according to a variable number of said units, a dog rocker for disengaging said movable dog from said escapement member, means for reengaging said movable dog with said escapement member, and means movably mounted with respect to said dog rocker and cooperating therewith for retarding the action of said reengaging means to enable said movable dog to complete its retrograde movement before reengaging said escapement member.

2. A mechanism as claimed in claim 1, wherein said retarding means comprise an element movable through various extents and adapted to precede said movable dog during said retrograde movement and to arrest same upon completion of said movement, and means controlled by said element for disabling said reengaging means during the full extent of the movement of said element.

3. In a variable spacing mechanism, an escapement member having teeth spaced apart at unit intervals of spacing, a movable dog normally engaging the escapement member and being adapted to be disengaged therefrom to retrograde to a variable extent according to a variable number of said units, a movable element normally engaging said movable dog, first spring means for urging said movable dog to retrograde, second spring means for urging said element to precede the retrograde movement of said movable dog, a universal bar for disengaging said movable dog from said element and from said escapement member, means for reengaging said movable dog with said element and with said escapement member, selectable stop means for variably arresting the movement of said element, and means on said element for disabling said reengaging means until completion of a retrograde movement of said movable dog corresponding to the movement made by said element.

4. A mechanism as claimed in claim 3, wherein said movable dog is carried by a rockable support also carrying a fixed dog, said dogs alternately engaging said escapement member upon rocking said support, said universal bar being adapted to impart a forward stroke to said support, said disabling means being adapted to prevent said support from making its return stroke.

5. In a variable spacing mechanism, an escapement wheel having teeth spaced apart at unit intervals of spacing, a movable dog mounted to turn about the axis of said wheel and normally engaging said wheel, said dog being adapted to be disengaged therefrom to retrograde to a variable number of said units, a finger on said dog, a sector mounted to turn about the axis of said wheel and having a slot normally engaged by said finger, first spring means for urging said dog to retrograde, second spring means for urging said sector to precede the retrograde movement of said dog by turning about said axis, a universal bar for disengaging said finger from said slot and said dog from said wheel, means for reengaging said finger with said slot and said dog with said wheel, selectable stop means for variably arresting the turning of said sector, and means on said sector for disabling said reengaging means until completion of a retrograde movement of said dog corresponding to the extent turned by said sector.

6. In a variable spacing mechanism, an escapement member having teeth spaced apart at unit intervals of spacing, a movable dog normally engaging the escapement member and being adapted to be disengaged therefrom to retrograde to a variable extent according to a variable number of said units, a dog rocker for disengaging said movable dog from said escapement member, a universal bar, an element movable under the action of said universal bar, and means for rocking said dog rocker, said means being adapted to be controlled by said element immmediately upon the beginning of its movement for disengaging said movable dog and further controlled immediately before completion of said movement for reengaging said movable dog, the intermediate portion of said movement being without effect on said movable dog.

7. In a variable spacing mechanism, an escapement member having teeth spaced apart at unit intervals of spacing, a movable dog normally engaging the escapement member and being adapted to be disengaged therefrom to retrograde to a variable extent according to a variable number of said units, a dog rocker for disengaging said movable dog from said escapement member, a universal bar, and cam means reciprocable under the action of said universal bar for rocking said dog rocker, said cam means comprising a first sloping portion adapted to act upon said dog rocker for alternately disengaging and reengaging said movable dog upon reciprocation of said cam means, and an adjacent substantially flat portion adapted to keep the movable dog in its disengaged position upon being so disengaged and before being so reengaged.

8. In a mechanism as claimed in claim 7, wherein said universal bar is of the reciprocable type, the universal bar during its forward stroke being adapted to impart the forward stroke to said cam means, a spring for imparting the return stroke to said cam means, said return stroke being retarded with respect to the return stroke of said universal bar.

9. In a mechanism as claimed in claim 7, type actions adapted to impact upon said universal bar, a spring for imparting the return stroke to said cam means, said flat portion being extended to enable said cam means to travel during its forward stroke within a relatively wide range of variation of the impact of said type actions, said cam means being adapted to be resiliently arrested by said spring.

10. In a typewriting machine, a carriage, a spacing mechanism therefor comprising an escapement member having teeth spaced apart at relatively small intervals of spacing, a dog normally engaging the escapement member, means for disengaging said dog from the escapement member to release the carriage for continuous travels, and settable tabulator stops for positioning said carriage in predetermined columns, the combination of an auxiliary toothed member having its teeth invariably spaced apart at a multiple of said interval of spacing, a pawl adapted under the control of said stops to engage said auxiliary member for arresting said continuous travel before reengagement of said dog with said escapement member, and means movable with said auxiliary member for disabling said disengaging means substantially upon arrest of said travel by said pawl.

11. In a typewriting machine having a carriage, a spacing spring normally urging said carriage in an advancing direction, a spacing mechanism for said carriage comprising including an escapement member having teeth spaced apart at relatively small intervals of spacing, a dog normally engaging the escapement member, means for disengaging said dog from the escapement member to release the carriage during carriage return travels, a margin regulator movable with the carriage to limit the return travel thereof, an auxiliary toothed member having its teeth spaced apart at a multiple of said interval of spacing, a pawl adapted to engage said auxiliary member to arrest said return travel, and means conditionable by said margin regulator to cause said pawl to temporarily engage said auxiliary member, said last named means releasing said pawl from engagement with said auxiliary member upon the recoil of the carriage caused by said spacing spring subsequent to said arrest.

12. In a typewriting machine having a carriage, a spacing mechanism therefor comprising an escapement member having teeth spaced apart at relatively small intervals of spacing, a dog normally engaging the escapement member, means for disengaging said dog from said escapement member to release the carriage during tabulation travels thereof, and a tabulator of the type comprising a stop movable with the carriage and a settable counterstop engageable with said movable stop, the combination of an auxiliary toothed member having its teeth spaced apart at a multiple of said interval of spacing, a pawl adapted to engage said auxiliary member to arrest said travel, means controlled by said counterstop upon engagement with said movable stop to cause said pawl to effect said engagement with said auxiliary member, and means controlled by said pawl to disable said disengaging means.

13. In a typewriting machine having a carriage, a spacing mechanism therefor comprising an escapement member having teeth spaced apart at relatively small intervals of spacing, a dog normally engaging the escapement member, means for disengaging said dog from said escapement member to release the carriage during tabulation travels thereof, and a tabulator of the type comprising a stop movable with the carriage and a settable counterstop engageable with said movable stop, the combination of an auxiliary toothed member having its teeth spaced apart at a multiple of said interval of spacing, a pawl adapted to engage said auxiliary member to arrest said travel, means controlled by said counterstop upon engagement with said movable stop to cause said pawl to effect said engagement with said auxiliary member, said pawl upon engagement with said auxiliary member being adapted to be moved along with said auxiliary member through a limited extent before arresting said carriage, means controlled by said pawl upon being so moved for restoring the set counterstop, and means controlled by said counterstop upon being so restored for disabling said disengaging means and for disengaging said pawl from said auxiliary member.

References Cited in the file of this patent

UNITED STATES PATENTS

| | | |
|---|---|---|
| 559,325 | Ellis | Apr. 28, 1896 |
| 2,111,410 | Stickney | Mar. 15, 1938 |
| 2,606,641 | Kleinschmidt | Aug. 12, 1952 |
| 2,831,558 | Toggenburger | Apr. 22, 1958 |

UNITED STATES PATENT OFFICE
CERTIFICATION OF CORRECTION

Patent No. 2,945,578                                             July 19, 1960

Giuseppe Beccio

It is hereby certified that error appears in the above numbered patent requiring correction and that the said Letters Patent should read as corrected below.

In the heading to the printed specification, line 7, for "Claims priority, application Italy Oct. 21, 1957" read -- Claims priority, application Italy July 23, 1955 --.

Signed and sealed this 25th day of April 1961.

(SEAL)
Attest:

ERNEST W. SWIDER                                        DAVID L. LADD
Attesting Officer                                         Commissioner of Patents